June 5, 1928.
A. V. MEYER
1,672,576
INSECT TRAP
Filed Dec. 13, 1926
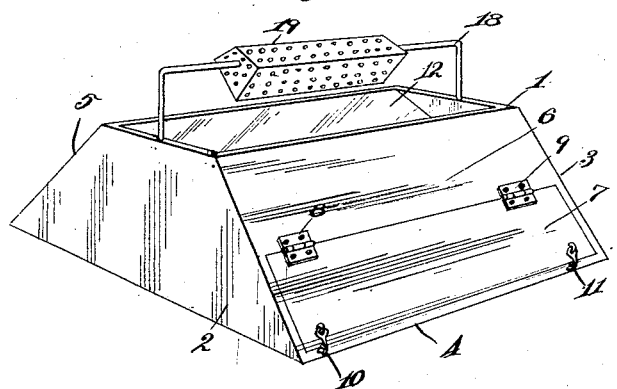
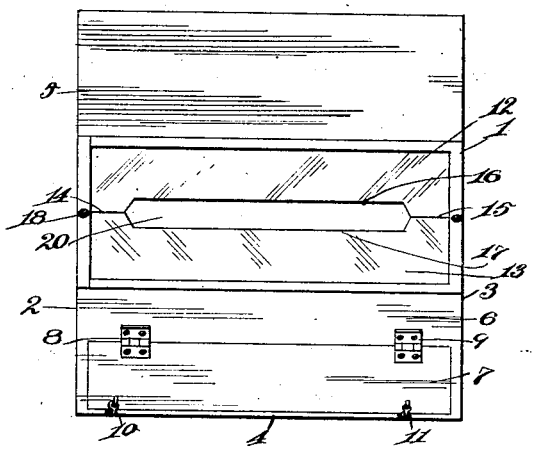
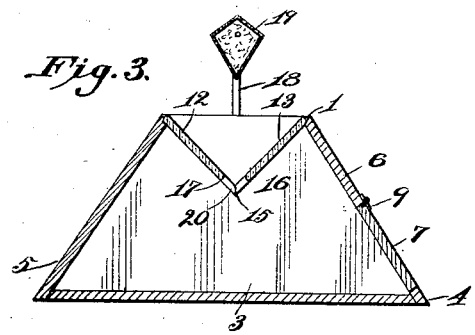
Inventor
A. V. Meyer
by Hazard and Miller
Attorneys Patented June 5, 1928.

1,672,576

UNITED STATES PATENT OFFICE.

ADOLPH V. MEYER, OF PASADENA, CALIFORNIA.

INSECT TRAP.

Application filed December 13, 1926. Serial No. 154,490.

This invention relates to traps and more particularly to that class of traps which is adapted to catch insects, such as flies, beetles, bugs, spiders, centipedes, roaches and other forms of invertebrate animals.

An object of this invention is to provide a trap which is efficient in its operation and which is inexpensive to manufacture and well serves the purpose for which it is adapted.

With the foregoing and other objects in view which will be made manifest in the following detailed description and specifically pointed out in the appended claim, reference is had to the accompanying drawings for an illustrative embodiment of the invention, wherein:

Figure 1 is a perspective view of my insect trap showing the same in set-up relation, Fig. 2 is a plan view of the trap with the insect bait holder removed, and Fig. 3 is a sectional view of Fig. 2.

Referring to the accompanying drawings wherein similar reference characters designate similar parts throughout, the insect trap is designated at 1 and comprises a substantially trapezohedral box-like structure having side walls 2 and 3 which may be constructed of glass, if desired, a bottom wall 4, a front wall 5 and a rear wall 6. The rear wall is preferably formed with a door 7, which door is secured to the wall 6 by means of suitable hinges 8 and 9 and latches 10 and 11. This door is adapted to be swung upwardly to remove insects therefrom and for cleaning purposes. This structure may be formed of wood, galvanized iron, fine wire, tin or any other suitable material, and is provided with an open top. Extending downwardly at an angle from the edges of this top are panes of glass 12 and 13, which panes are adapted to abut as at 14 and 15 and which have cutaway portions 16 and 17 which are adapted to form an elongated slot 20 communicating with the interior of the trap.

An inverted U-shaped bait supporting member is designated at 18, and as shown in Fig. 1 has thereon a perforated metal bait holder 19 which is preferably in the form of a parallelepipedon and which is adapted to hold bait therein and which is located directly above the opening 20.

The operation of my device is as follows: Insects in the vicinity of my trap are attracted toward the bait holder 19 and towards this end they may crawl up the sloping sides 5 and 6 toward the same. Upon arriving at the truncated top of the structure, they are unable to reach the bait and in attempting to do so, they fall down the smooth glass surface and through the opening 20 into the trap where it is impossible for them to escape. Winged insects may also be captured in my trap by virtue of the fact that they may fly around in the vicinity of the bait and once they have crawled or flown through the opening 20, they become confused and they are unable to find their way out by virtue of the light admitted through the side walls 2 and 3.

It is obvious then that I have constructed an insect trap which is extremely simple and inexpensive to manufacture and which is adapted to entrap all manner of insects.

It will be understood that various changes may be made in the detail of construction without departing from the spirit and scope of the invention as defined by the appended claim.

I claim:

A cockroach trap comprising in combination a box-like structure trapezohedral in shape, having an open top, inclined glass plates extending downwardly in converging relationship into said open top, said plates having opposed elongated notches formed therein, said notches combining to form a slot between said plates, a parallelepipedonal forming a bait holder suspended above said trapezohedral structure and centered above said open top, one inclined side of said trapezohedral structure having a hinged door formed therein, said door being hinged so as to swing upwardly.

In testimony whereof I have signed my name to this specification.

ADOLPH V. MEYER.